United States Patent [19]

Pagano

[11] Patent Number: 5,234,175
[45] Date of Patent: Aug. 10, 1993

[54] FILM CARTRIDGE WITH FILM RELATED INDICATOR

[75] Inventor: Daniel M. Pagano, Henrietta, N.Y.

[73] Assignee: Eastman Kodak Company, Rochester, N.Y.

[21] Appl. No.: 867,655

[22] Filed: Apr. 10, 1992

[51] Int. Cl.$^5$ .............................................. G03B 17/26
[52] U.S. Cl. ...................................... 242/71.1; 354/275
[58] Field of Search ................. 354/275; 242/71, 71.1, 242/71.7

[56] References Cited

U.S. PATENT DOCUMENTS

| | | | |
|---|---|---|---|
| 3,266,397 | 8/1966 | Kremp et al. | 95/31 |
| 3,667,363 | 6/1972 | Tanaka | 95/31 |
| 4,024,557 | 5/1977 | Aoyama et al. | 242/71.1 X |
| 4,887,110 | 12/1989 | Harvey | 242/71.1 X |
| 4,918,471 | 4/1990 | Harling et al. | 354/21 |
| 4,962,401 | 10/1990 | Takahashi | 242/71.1 X |
| 5,064,134 | 11/1991 | Pagano et al. | 242/71.1 |
| 5,083,155 | 1/1992 | Kataoka et al. | 242/71.1 X |

*Primary Examiner*—Daniel P. Stodola
*Assistant Examiner*—Paul T. Bowen
*Attorney, Agent, or Firm*—Roger A. Fields

[57] ABSTRACT

A film cartridge comprises a cartridge shell for housing a filmstrip, and a coded mechanism for providing an indication of one or more properties of the filmstrip. The coded mechanism includes a cavity formed in the outside of the shell to be accessible, a cover affixed to the outside of the shell that completely covers the cavity, and at least one cut-out in the cover uniquely positioned over the cavity to permit entry into the cavity only through the cut-out to provide an indication of one or more properties of a filmstrip housed in the shell.

3 Claims, 2 Drawing Sheets

FILM CARTRIDGE WITH FILM RELATED INDICATOR

BACKGROUND OF THE INVENTION

1. Field of the Invention

The invention relates generally to the field of photography, and in particular to a film cartridge having coded means indicative of one or more film characteristics such as film speed.

2. Description of the Prior Art

It is well known for a 35 mm film cartridge to include coded means indicative of one or more film characteristics such as film speed. According to one example, the commercially available KODAK DX 35 mm film cartridge has a series of six patches or areas located on the outside of the cartridge shell. Patch no. 1 is conductive for every available film speed since it is intended to serve as a common area or ground for sensing by a corresponding electrical probe in a camera designed for use with the DX cartridge. Patches no. 2–6 are selectively conductive or non-conductive for sensing by respective electrical probes in the camera to provide binary encodements of respective film speeds as ISO speed values or the equivalent DIN speed values. An insulative paint covers those patches selected to be non-conductive to prevent them from being conductive. Further details of the DX cartridge are disclosed in U.S. Pat. No. 4,982,209, issued Jan. 1, 1991.

Another example of a film cartridge with a film speed encodement is disclosed in U.S. Pat. No. 3,444,795, issued May 20, 1969. In this instance, the cartridge shell has a series of equally spaced locations each one of which either is notched or is not notched for sensing by mechanical probes in a camera to provide binary encodements of respective film speeds.

SUMMARY OF THE INVENTION

According to the invention, a film cartridge comprising a cartridge shell for housing a filmstrip, and coded means for providing an indication of one or more properties of the filmstrip, is characterized in that:

said coded means includes an exterior cavity formed in the outside of the shell to be accessible, a cover affixed to the outside of the shell that covers the cavity, and at least one cut-out in the cover uniquely positioned over the cavity and smaller than the cavity to permit access to the cavity only through the cut-out and to provide an indication of one or more properties of a filmstrip housed in the shell.

DETAILED DESCRIPTION OF THE PREFERRED EMBODIMENT

The invention is disclosed as being embodied preferably in a 35 mm film cartridge. Because the features of this type of film cartridge are well known, the description which follows is directed in particular to elements forming part of or cooperating directly with the disclosed embodiment. It is to be understood, however, that other elements not specifically shown or described may take various forms known to persons of ordinary skill in the art.

Figure 1:
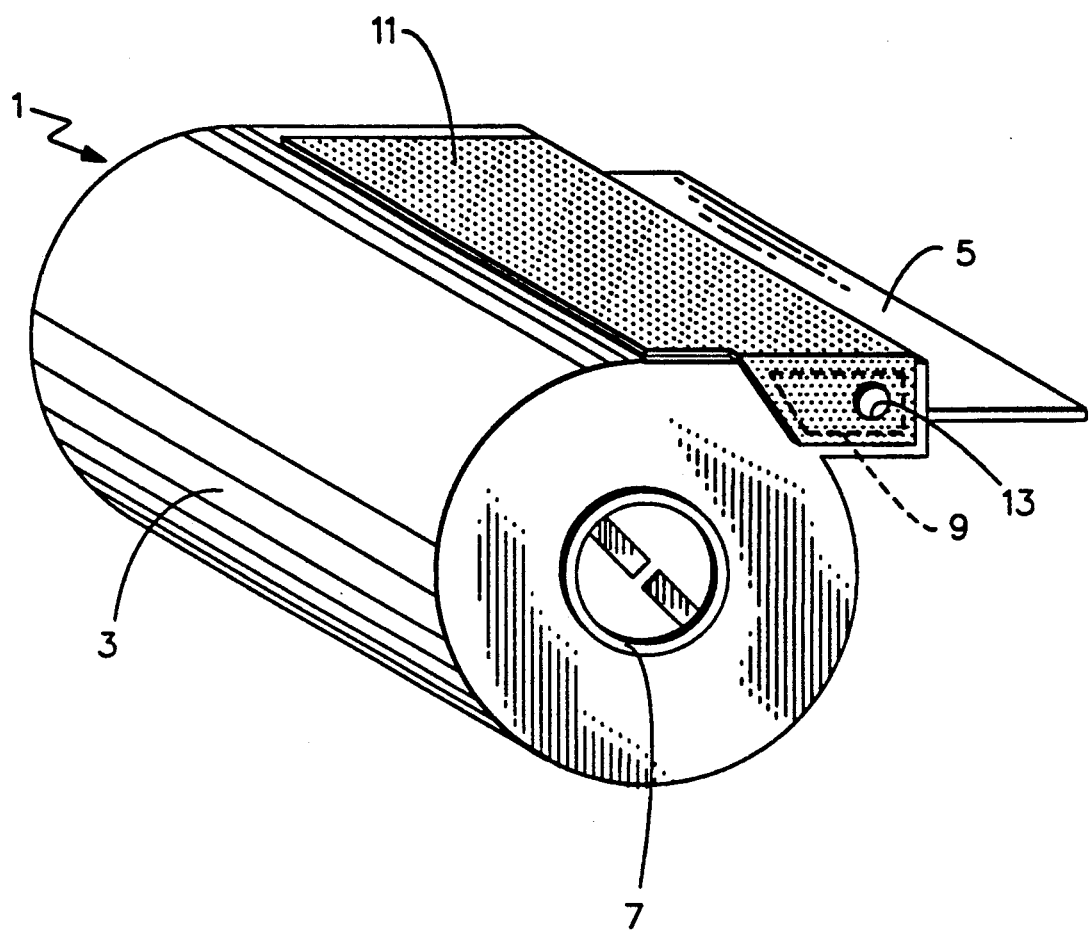
FIG. 1 is a perspective view of a film cartridge with a film related indicator according to a preferred embodiment of the invention.

Referring now to the drawings, FIG. 1 shows a 35 mm film cartridge 1 comprising a lighttight cartridge shell 3 for housing a filmstrip 5. The filmstrip 5 is stored in roll form on a spool 7 supported for rotation inside the shell 3 in film unwinding and winding directions. A slit-like passageway (not shown) in the shell 3 permits movement of the filmstrip 5 into and out of the shell.

According to the invention, a cavity 9 is formed in the outside of the shell 3 to be accessible by one or more mechanical probes or sensors (not shown) in a camera when the film cartridge 1 is loaded into the camera. A cover, preferably a film information label 11, is affixed to the outside of the shell 3 to cover the cavity 9. See FIG. 1. The label 11 has at least one cut-out, preferably a hole 13, uniquely positioned over the cavity 9 to permit a corresponding probe in the camera to enter the cavity only through the hole. Thus, the hole 13 can serve as a binary indication of one or more properties of the filmstrip 5, such as film speed, as is taught by the prior art.

Figure 2:
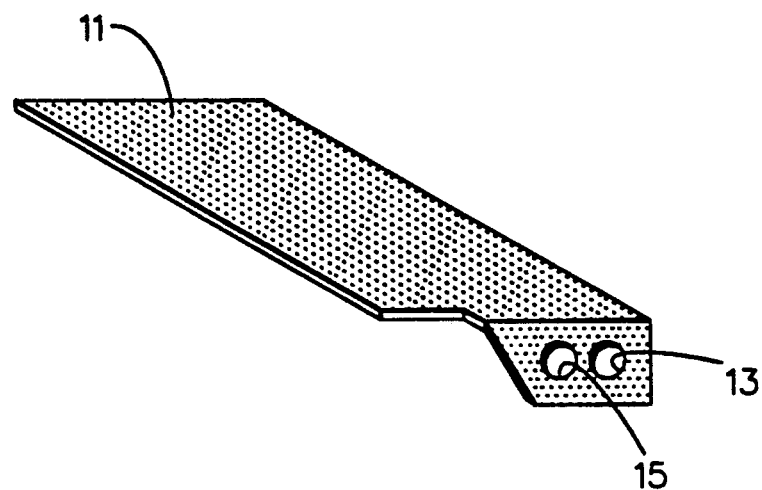
FIG. 2 is a perspective view only of the film related indicator.

FIG. 2 shows the label 11 with the hole 13 and a second hole 15 to provide a different binary indication than is depicted in FIG. 1. In this instance, corresponding probes in the camera would enter the cavity 9 through the respective holes 13 and 15.

Figure 3:
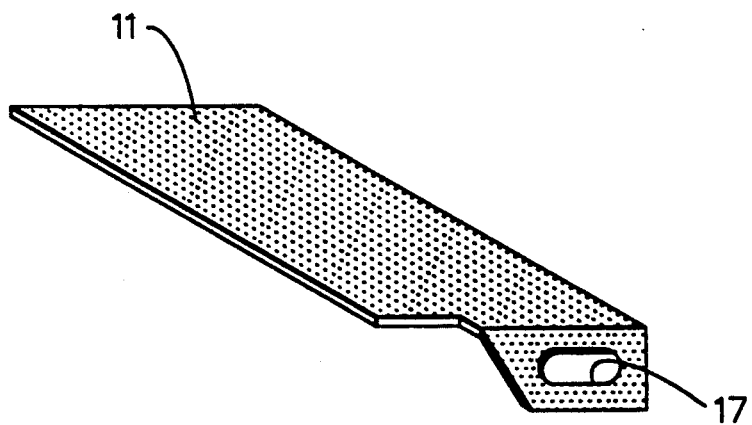
FIG. 3 is perspective view of an alternate embodiment of the film related indicator.

FIG. 3 shows the label 11 with a hole 17 that encompasses the two holes 13 and 15. The hole 17 is intended to provide the same binary indication as is depicted in FIG. 2.

The arrangement of the mechanical probes in the camera can vary as is known in the prior art. For example, a single probe can be used to detect the presence or absence of the hole 13. The absence of the hole 13 would provide a binary "0" to indicate an ISO speed value less than 400, and the presence of the hole would provide a binary "1" to indicate an ISO speed value of 400 or greater. Similarly, respective probes can be use to detect the presence or absence of the holes 13 and 15. The absence of the holes 13 and 15 would provide binary "0, 0" to indicate an ISO speed value of 25. The absence of the hole 13 and the presence of the hole 15 would provide binary "0, 1" to indicate an ISO speed value of 100. The presence of the hole 13 and the absence of the hole 15 would provide binary "1, 0" to indicate an ISO speed value of 400. The presence of the holes 13 and 15 would provide binary "1, 1" to indicate an ISO speed value of 1600. Of course, to indicate more ISO speed values more holes and corresponding probes would be included.

The invention has been described with reference to a preferred embodiment and an alternate embodiment. However, it will be appreciated that variations and modifications can be effected within the ordinary skill in the art without departing from the scope of the invention. For example, instead of the holes 13 and 15 in the label 11, notches can be cut in the label which like the holes open to the cavity 9.

I claim:

1. A film cartridge comprising a cartridge shell for housing a filmstrip, and coded means for providing an indication of one or more properties of the filmstrip, is characterized in that:

said coded means includes an exterior cavity formed in the outside of said shell to be accessible, a cover affixed to the outside of said shell that covers said cavity, and at least one cut-out in said cover uniquely positioned over said cavity and smaller than the cavity to permit access to the cavity only through said cut-out and to provide an indication of one or more properties of a filmstrip housed in said shell.

2. A film cartridge as recited in claim 1, wherein said cover is a film information label.

3. A film cartridge as recited in claim 1, wherein said cavity and said cover are individually dimensioned to provide space for the cover to have at least two cut-outs uniquely positioned over the cavity to permit access to the cavity simultaneously through the cut-outs.

* * * * *